(No Model.)

W. S. SHARPNECK.
JOURNAL BOX.

No. 357,636. Patented Feb. 15, 1887.

Witnesses
C. H. Raeder.

Inventor
William S. Sharpneck
By his Attorney T. J. W. Robertson

UNITED STATES PATENT OFFICE.

WILLIAM S. SHARPNECK, OF DENVER, COLORADO.

JOURNAL-BOX.

SPECIFICATION forming part of Letters Patent No. 357,636, dated February 15, 1887.

Application filed June 5, 1886. Serial No. 204,253. (No model.)

*To all whom it may concern:*

Be it known that I, WILLIAM S. SHARPNECK, a citizen of the United States, residing at Denver, in the county of Arapahoe and State of Colorado, have invented certain new and useful Improvements in Anti-Friction Journal-Boxes, of which the following is a specification, reference being had therein to the accompanying drawings, in which—

Figure 1:
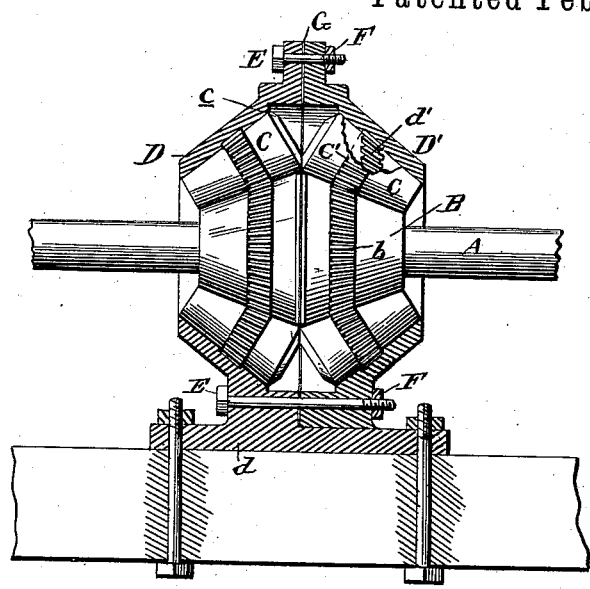
Figure 2:
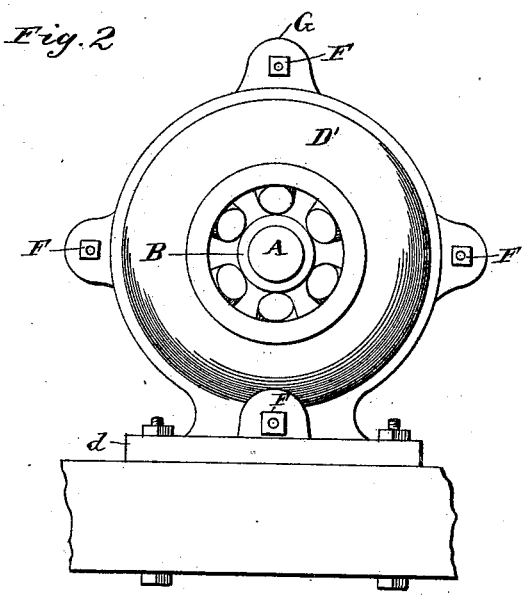

Figure 1 represents a central vertical longitudinal section with part broken away, and Fig. 2 an end view of the same.

This improvement relates to that class of anti-friction rollers in which gearing is employed to keep the rollers in their proper relative positions with respect to each other around the main shaft; and the invention consists in the peculiar construction, arrangement, and combinations of parts, hereinafter more particularly described, and then pointed out in the claims.

Referring to the details of the drawings, A represents the shaft provided with a collar, B, firmly fastened thereto and formed of the shape of two truncated cones with their bases adjacent to or touching each other, and with teeth $b$ formed substantially in the center of each cone.

Set around and supporting the collar are two sets of rollers, C, each formed of the shape of truncated cones with their bases beveled, as at $c$, and each provided with a ring of teeth, $c'$, that mesh with the teeth upon the roller B, and also with a ring of teeth, $d'$, upon the inside of the casing.

The casing is preferably formed, as shown in the drawings, in two parts, D D', one part, D, having the base $d$ formed integral therewith, and the other part, D', secured to the part D by the bolts E and nuts F, or otherwise. Between the two parts I prefer to place one or more thicknesses of paper, (represented at G,) so that by withdrawing the paper and screwing up the nuts tighter on the bolts the wear that takes place in the course of time may be compensated for, or any adjustment necessary in "assembling" the parts may be readily made.

It is important that all the bevels of the cones should be properly proportioned, so as to get the minimum of friction. I prefer an arrangement of bevels similar to that shown in the drawings; but it is evident that this may be varied to some extent without changing the spirit of my invention.

It will be seen that by the construction shown and described herein I have produced a new and valuable arrangement of anti-friction rollers, whereby all or nearly all of the friction is of the rolling variety, and hence reduced to a minimum, the rollers are all kept in their proper relative positions, and means for adjusting the parts or for taking up wear provided, and, besides these advantages, the parts are easy to make and not liable to get out of order or wear out.

I make no claim in this application to the shaft having bearing-surfaces in the form of truncated cones with their apexes extending toward each other, as the same is shown in my application No. 195,761, filed March 18, 1886.

What I claim as new is—

1. In an anti-friction journal-box, the combination of a shaft, conical rollers supporting the same, and a casing supporting said conical rollers, said shaft having a journal resting on the conical rollers, and formed in the shape of two truncated cones with their bases adjacent to each other, substantially as described.

2. In an anti-friction journal-box, a shaft provided with a bearing-surface in the shape of two truncated cones with their bases adjacent to each other, and each cone having teeth arranged around the same, in combination with two sets of conical toothed rollers, whose teeth mesh with those on said bearing-surface, and a suitable casing for supporting said rollers, substantially as described.

3. In an anti-friction journal-box, a shaft provided with a bearing-surface in the form of two truncated cones with their bases adjacent to each other and having teeth around the same, in combination with two sets of conical rollers having teeth meshing with the teeth on the bearing-surface, and a casing provided with means for drawing the two sets of rollers closer together, as desired, substantially as described.

4. The combination of the casing D D', having two rings of teeth, $d'$, formed in its inner surface and provided with adjusting means, as the bolts E and nuts F, with a shaft having a bearing-surface in the shape of two truncated cones with their bases adjacent to each other and having two sets of teeth formed around the same, and two sets of conical rollers, each having teeth which mesh with the teeth of the bearing-surface of the shaft and with those formed on the inside of the casing, substantially as described.

5. The combination, in a journal-box, of a shaft provided with a bearing-surface in the shape of two truncated cones with two sets of conical supporting-rollers having their bases beveled where they touch, whereby they roll together without friction where they come in contact, and a suitable casing in which said rollers turn, substantially as described.

In testimony whereof I affix my signature, in presence of two witnesses, this 5th day of June, 1886.

WILLIAM S. SHARPNECK.

Witnesses:
T. J. W. ROBERTSON,
M. P. CALLAN.